United States Patent
Junkawitsch et al.

(10) Patent No.: US 6,832,190 B1
(45) Date of Patent: Dec. 14, 2004

(54) METHOD AND ARRAY FOR INTRODUCING TEMPORAL CORRELATION IN HIDDEN MARKOV MODELS FOR SPEECH RECOGNITION

(75) Inventors: Jochen Junkawitsch, München (DE); Harald Höge, Gauting (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/700,133

(22) PCT Filed: May 3, 1999

(86) PCT No.: PCT/DE99/01307

§ 371 (c)(1),
(2), (4) Date: Nov. 10, 2000

(87) PCT Pub. No.: WO99/59141

PCT Pub. Date: Nov. 18, 1999

(30) Foreign Application Priority Data

May 11, 1998 (DE) .......................................... 198 21 030

(51) Int. Cl.⁷ .............................................. G01L 15/28
(52) U.S. Cl. ....................... 704/255; 704/256; 704/241; 704/240; 704/251
(58) Field of Search ................................ 704/255, 256, 704/251, 231, 240, 241

(56) References Cited

U.S. PATENT DOCUMENTS

| | | | | |
|---|---|---|---|---|
| 5,497,502 A | * | 3/1996 | Castille | 455/3.05 |
| 5,625,749 A | * | 4/1997 | Goldenthal et al. | 704/254 |
| 5,696,877 A | * | 12/1997 | Iso | 704/241 |
| 5,737,488 A | * | 4/1998 | Iso | 704/256 |

FOREIGN PATENT DOCUMENTS

| | | |
|---|---|---|
| DE | 42 22 916 A1 | 6/1993 |
| EP | 38 76 207 T2 | 6/1993 |
| WO | WO 97/10554 | 3/1997 |

OTHER PUBLICATIONS

Kim et al. "Frame–correlated hidden Markov model based on extended logarithmic pool," Speech and Audio Processing, IEEE Transactions on Speech and Audio Processing, vol. 5, No. 2, Mar. 1997.*

Qing et al. 'A new method used in HMM for modeling frame correlation,' Acoustics, Speech, and Signal Processing, 1999. ICASSP–99, Proceedings. 1999, IEEE International Conference on, vol. 1, Mar. 15–19, 1999, pp: 169–172.*

Takahashi et al. Phoneme HMMs constrained by frame correlations, Acoustics, Speech, and Signal Processing, 1993. ICASSP–93. 1993 IEEE International Conference on, vol. 2, Apr. 27–30, 1993, pp. 219–222.*

P. Kenny et al., "A Linear Predictive HMM for Vector–Valued Observations with Applications to Speech Recognition", IEEE Transactions on Acoustics, Speech and Signal Processing, vol. 38, pp. 220–225.

Paliwal, "Use of Temporal Correlation Between Successive Frames in an Hidden Markov Model Based Speech Recognizer", pp. II–215–II–218.

Wellekens, "Explicit Time Correlation in Hidden Markov Models for Speech Recognition", pp. 384–386.

(List continued on next page.)

*Primary Examiner*—Vijay Chawan
(74) *Attorney, Agent, or Firm*—Staas & Halsey LLP

(57) ABSTRACT

In the recognition of spoken language, phonemes of the language are modelled by hidden Markov models. A modified hidden Markov model includes a conditional probability of a feature vector dependent on chronologically preceding feature vectors and, optionally, additionally comprises a conditional probability of a respectively current status. A global search for recognizing a word sequence in the spoken language is implemented with the modified hidden Markov model.

7 Claims, 1 Drawing Sheet

OTHER PUBLICATIONS

Lee et al., "A Network–Based Frame–Synchronous Level Building Algorithm for Connected Word Recognition", pp. 410–413.

Junkawitsch et al., "Keyword Verification Considering the Correlation of Succeeding Feature Vectors".

Haberland et al., "Sprachunterricht", pp. 120–125.

Markel et al., "Linear Prediction of Speech", pp. 10–17.

Genest et al., "Combining Probability Distributions: A Critique and an Annotated Bibliography", pp. 114–149.

Junkawitsch et al., "Efficient Methods for Detecting Keywords in Continuous Speech".

G. Ruske, "Automatische Spracherkennug", pp. 67–86.

* cited by examiner

METHOD AND ARRAY FOR INTRODUCING TEMPORAL CORRELATION IN HIDDEN MARKOV MODELS FOR SPEECH RECOGNITION

BACKGROUND OF THE INVENTION

1. Field of the Invention

The present invention is directed to a method and to an arrangement for the recognition of spoken language by a computer.

2. Description of the Related Art

A method and an arrangement for the recognition of spoken language are known from publication, by N. Haberland et al., "Sprachunterricht—wie funktioniert die computerbasierte Spracherkennung!", c't—Magazin für Computertechnik—May 1998, Heinz Heise Verlag, Hannover, 1998. Particularly until a recognized word sequence is obtained from a digitalized voice signal, a signal analysis and a global search that accesses an acoustic model and a linguistic model of the language to be recognized are implemented in the recognition of spoken language. The acoustic model is based on a phoneme inventory, converted with the assistance of hidden Markov models (HMMs), and on a pronunciation lexicon, converted as a tree lexicon. The linguistic model contains a tri-gram statistics, i.e. a sequence of three words. With the assistance of the acoustic model, the most probable word sequences are determined during the global search for feature vectors that proceeded from the signal analysis and these are output as recognized word sequence. The relationship that has been presented is explained in depth in publication by N. Haberland et al., Sprachunterricht—wie funktioniert die computerbasierte Spracherkennung.

In order to follow the subsequent comments, the terms that are employed shall be briefly discussed here.

As a phase of the computer-based speech recognition, the signal analysis particularly comprises a Fourier transformation of the digitalized voice signal and a feature extraction following thereupon. It proceeds from publication by N. Haberland et al., "Sprachunterricht—wie funktioniert die computerbasierte Spracherkennung?" that the signal analysis ensues every ten milliseconds. From overlapping time segments with a respective duration of, for example, 25 milliseconds, approximately 30 features are determined on the basis of the signal analysis and combined to form a feature vector. For example, given a sampling frequency of 16 kHz, 400 signal amplitude values enter into the calculation of a feature vector. In particular, the components of the feature vector describe the spectral energy distribution of the appertaining signal excerpt. In order to arrive at this energy distribution, a Fourier transformation is implemented on every signal excerpt (25 ms excerpt). The presentation of the signal in the frequency domain is thus obtained and, thus, the components of the feature vector. After the signal analysis, thus, the digitalized voice signal is present in the form of feature vectors.

These feature vectors are supplied to the global search, a further phase of the speech recognition. As already mentioned, the global search makes use of the acoustic model and, potentially, of the linguistic model in order to image the sequence of feature vectors onto individual parts of the language (vocabulary) which are present as a model A language is composed of a given plurality of sounds, that are referred to as a phonemes, whose totality is referred to as phoneme inventory. The vocabulary is modelled by phoneme sequences and stored in a pronunciation lexicon. Each phoneme is modelled by at least one HMM. A plurality of HMMs yield a stochastic automaton that comprises statusses and status transitions. The time execution of the occurrence of specific feature vectors (even within a phoneme) can be modelled with HMMs. A corresponding phoneme model thereby comprises a given plurality of statusses that are arranged in linear succession. A status of an HMM represents a part of a phoneme (for example an excerpt of 10 ms length). Each status is linked to an emission probability, which, in particular, has a Gaussian distribution, for the feature vectors and to transition probabilities for the possible transitions. A probability with which a feature vector is observed in an appertaining status is allocated to the feature vector with the emission distribution. The possible transitions are a direct transition from one status into a next status, a repetition of the status and a skipping of the status.

The joining of the HMM statusses to the appertaining transitions over the time is referred to as a trellis. The principle of dynamic programming is employed in order to determined the acoustic probability of a word: the path through the trellis is sought that exhibits the fewest errors or, respectively, that is defined by the highest probability for a word to be recognized.

Parameters of the emission distributions are determined on the basis of exemplary sets in a training phase.

In addition to the described acoustic model, the language model (also: linguistic model) is also potentially taken into consideration in the global search. The language model has the job of determining the linguistic probability of a set hypothesis. When a sequence of words has no meaning, then this sequence has a correspondingly slight linguistic probability in the language model. In particular, sequences of two words (bi-grams) or of three words (tri-grams) are utilized in order to calculate linguistic probabilities for these bi-grams or, respectively, tri-grams. Due to the nearly arbitrary combination of words of the vocabulary in bi-grams, tri-grams or, respectively, n-grams, a storing of all n-grams is ultimately a question of the available memory.

The result of the global search is the output or, respectively, offering of a recognized word sequence that derives taking the acoustic model (phoneme inventory) and the language model into consideration.

Given an HMM, it is assumed that an emission probability for a feature vector is dependent on only one status. Modelling errors that, according to the above comments, have a significant influence on the recognized word sequence derive as a result of this assumption.

The publication Kenny et al., "Linear Predictive HMM for Vector-Valued Observations with Applications to Speech recognition", IEEE Transactions on ASSP, Volume 38, 1990, pages 220–225, discloses a method for recognizing spoken language with a computer wherein feature vectors for describing a digitalized voice signal are calculated dependent of a plurality of preceding feature vectors.

SUMMARY OF THE INVENTION

An object of the present invention is to provide an arrangement and a method for speech recognition that enables an improved recognition on the basis of modified hidden Markov models compared to the Prior Art.

This object is achieved a method for recognizing spoken language with a computer, wherein a digitalized voice signal is determined from the spoken language, a signal analysis from which feature vectors for describing the digitalized voice signal proceed is implemented on the digitalized voice signal, a global search for imaging the feature vectors onto a language present in modelled form is implemented, whereby phonemes of the language are described by a modified hidden Markov model, the modified hidden Markov model comprises a conditional probability of a feature vector of a prescribed plurality of prescribed plurality of preceding feature vectors, the conditional probability is approximated by a combination of two separately modelled probabilities, the first separately modelled probability ignores a correlation of the feature vectors, whereas the second separately modelled probability takes the correlation of the feature vectors into consideration, and the spoken language is recognized in that a recognized word sequence is offered by the global search.

For achieving the object, a method for the recognition of spoken language with a computer is recited wherein a digitalized speech signal is determined from the spoken language and a signal analysis is implemented with the digitalized voice signal, whereby feature vectors are determined for the description of the digitalized voice signal. In a global search for imaging the feature vectors on to a language present in modelled form, each phoneme of the language is described by a modified hidden Markov model. The modified hidden Markov model thereby comprises a conditional probability of a feature vector dependent on a pre-determined plurality of preceding feature vectors. The spoken language is recognized in that a recognized word sequence is offered as result of the global search.

It is thereby a decided advantage that a clearly better recognition rate can be documented compared to the modelling of the hidden Markov model known from the Prior Art (see the introduction to the specification) on the basis of the description of the modified hidden Markov model by taking a correlation of preceding feature vectors into consideration.

One development of the invention is comprised therein that the modified hidden Markov model additionally comprises a conditional probability of each status.

A clear improvement of the speech recognition arises by taking past feature vectors and the respective HMM status into consideration.

In particular, the method serves for the recognition of key words in spoken language. It is important in the key word recognition that all key words are dependably recognized from a pre-determined, closed set of key words). Given employment of a speech recognition system for example individual word recognition in the framework of a safety-critical application, for example in the control of a motor vehicle, it is important that the spoken commands are dependably recognized, i.e. with little error, and, thus, an emergency control to be potentially promoted is assured by voice input.

The method can also be utilized in automatic computer-assisted dialoging.

In dialoging, the vocabulary is preferably limited to a specific field of application, for example banking, hotel reservations or ordering a rental car. Such a system must assure high user acceptance since, when a user repeatedly does not understand, there is the risk that this user will no longer use the system. In particular, the relevant words are thereby recognized in the spoken language, whereby this can be expressed fluently and independently of the speaker.

The use of the method presented here is advantageous both in the automatic recognition of key words as well as in computer-assisted dialoging, since an improved recognition performance respectively promotes user acceptance and, thus, promotes the spread of computer-based speech recognition systems.

Further, an arrangement for the recognition of spoken language is recited that comprises a unit for signal analysis that is configured such that feature vectors can be determined from the spoken language. Further, a unit for the global search is provided that is configured such that the feature vectors can be imaged onto a language present in modelled form. Finally, the arrangement comprises a processor unit that is configured such that a modified hidden Markov model comprises a conditional probability for a current feature vector dependent on a predetermined plurality of preceding feature vectors, whereby an imaging of the feature vectors onto the language present in modelled form can be implemented with the modified hidden Markov model.

One development of the invention is comprised therein that the processor unit is configured such that the modified hidden Markov model additionally comprises a conditional probability of a respectively current status.

This arrangement/apparatus is especially suited for the implementation of the above-explained inventive method or one of its developments.

Developments of the invention are provided by improvements, for example, wherein the modified hidden Markov model additionally comprises a conditional probability of a respectively current status. The method may be used for recognizing key words in the spoken language. In one embodiment, the method provides automatic, computer-assisted dialoging.

The present invention also provides an arrangement for recognizing spoken language, including a unit for signal analysis that is configured such that feature vectors can be determined from the spoken language, a unit for global searching that is configured such that the feature vectors can be imaged onto a language present in modelled form, a processor unit that is configured such that a modified hidden Markov model comprises a conditional probability for a current feature vector dependent on a predetermined plurality of preceding feature vectors, whereby the conditional probability is approximated by a combination of two separately modelled probabilities, the first separately modelled probability ignoring a correlation of the feature vectors, whereas the second separately modelled probability takes the correlation of the feature vectors into consideration, and an imaging of the feature vectors onto the language present in modelled form can be implemented with the modified hidden Markov model.

In a preferred embodiment, the arrangement whereby the processor unit is configured such that the modified hidden Markov model additionally comprises a conditional probability of a respectively current status.

BRIEF DESCRIPTION OF THE DRAWINGS

Exemplary embodiments of the invention are presented and explained below with reference to the drawing.

DETAILED DESCRIPTION OF THE PREFERRED EMBODIMENTS

Figure 1:
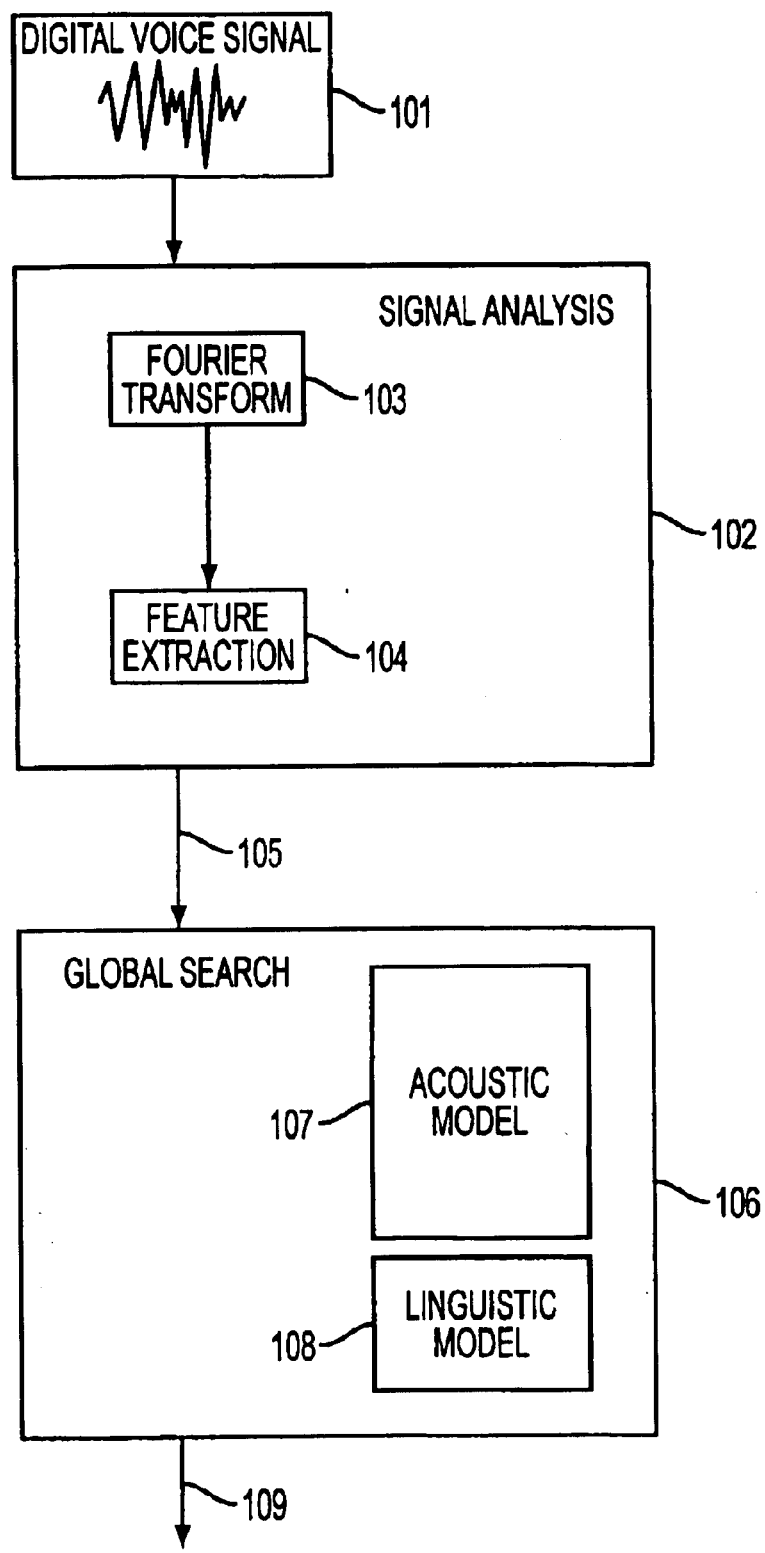
FIG. 1 is a block diagram of an arrangement or, respectively, a method for the recognition of spoken language.

FIG. 1 shows an arrangement or, respectively, a method for the recognition of spoken language. The introduction to the specification is referenced for explaining the terms employed below.

In a signal analysis 102, a digitalized voice signal 101 is subjected to a Fourier transformation 103 with a following feature extraction 104. The feature vectors 105 are communicated to a system for global searching 106. The global search 106 considers both an acoustic model 107 as well as a linguistic model 108 for determining the recognized word sequence 109. Accordingly, the digitalized voice signal 101 becomes the recognized word sequence 109.

The phoneme inventory is simulated in the acoustic model 107 on the basis of hidden Markov models.

Hidden Markov models are usually utilized for modelling the probability P(O|W) of a feature vector sequence O under the condition of a specific word. It is assumed in the described, modified HMMs that a local emission probability $b_{q_t}$ of a status $q_t$ at the time t is dependent on the previous p feature vectors:

$$b_{q_t}: P(O_t-1, \ldots O_{t-p}, q_t) \qquad (1).$$

This emission probability $b_{q_t}$ is approximated by a suitable combination P''($O_t$) of two separately modelled probability densities:

$$P''(O_t) = P_1(O_t) \circ P_2(O_t) \qquad (2).$$

$P_1(O_t)$ references the traditional emission probability, i.e. leaving the correlation out of consideration, whereas $P_2(O_t)$ considers the correlation of the feature vectors:

$$P_1(O_t) = P(O_t|q_t) \qquad (3)$$

$$P_2(O_t) = P(O_t|O_t-1, \ldots O_{t-p}) \qquad (4).$$

The expression $P_t(O)$ is given by a normally distributed probability density function $$\mathcal{N}(\mu, \Sigma = I \cdot \sigma^2)$$

of a hidden Markov model status, whereby $\mu$ references an average value, $\Sigma$ references a covariance matrix that contains the variances $\sigma^2$ in its principal diagonals, and I references a unit matrix.

$P_2(O_t)$ is estimated with the assistance of a linear predictor. A linear predictor is a suitable method for processing a sequence of correlated data. It can be utilized in order to obtain an estimated value for a specific feature vector $O_t$, taking the p preceding feature vectors $\{O_t-1, \ldots, O_{t-p}\}$ into consideration (see the publication by J. D. Markel et al., "Linear Prediction of Speech", Springer Verlag, New York, 1980).

$$O_t = \hat{O}_t + \xi = \sum_{i=1}^{p} A_i O_{t-i} + \xi. \qquad (5)$$

The predictor coefficients $A_i$ thereby reference matrices, $\hat{O}_t$ is an estimated value of a real feature vector and $\xi$ is an error vector that arises due to the prediction.

A further important step, a linear discriminance analysis (see the publication by G. Ruske, "Automatische Spracherkennung" Oldenbourg Verlag, Munich 1988, pages 67–86), is applied after the feature extraction, so that the individual components of the feature vector are decorrelated and no dependencies between different dimensions of the feature vector need be considered. The predictor can therefore individually handle each component, the predictor coefficients $A_i$ become diagonal matrices.

The random variable $O_t$ is the sum of two random variables $\hat{O}_t$ and $\xi$. The probability of $O_t$ is thus to be determined by a convolution of the appertaining probability density functions $P_{\hat{O}_t}$ and $P_\xi$. Since $\hat{O}_t$ proceeds from the predictor, the appertaining probability density function is a Dirac pulse with $$P_{\hat{O}_t}(O_t) = \delta(O_t - \hat{O}_t) \qquad (6).$$

The remaining prediction error $$\xi = O_t - \hat{O}_t \qquad (7)$$

can be assumed to be a normally distributed random variable with an average value $$\mu_\xi = 0 \qquad (8)$$

and, thus, $$P_\xi = \frac{1}{\sqrt{(2\pi)^N |\Sigma_\xi|}} \cdot e^{-\frac{1}{2}\xi^T \Sigma_\xi^{-1} \xi}. \qquad (9)$$

derives for its probability. Due to the decorrelated vector components, the covariance matrix $\Sigma_\xi$ is again a diagonal matrix. The deriving emission probabilities of the feature vector $O_t$ can be expressed as $$\begin{aligned} P_2(O_t) &= P(O_t|O_{t-1}, \ldots, O_{t-p}) \\ &= P_{\hat{O}_t}(O_t) * P_\xi(O_t) \\ &= P_\xi(O_t - \hat{O}_t) = P_\xi(\xi). \end{aligned} \qquad (10)$$

An emission probability of a feature vector that co-considers the time correlation of preceding feature vectors can be determined by using a linear predictor in the described way.

Combined Probability Density Functions

According to the known theory (see the publication by C. Genest et al., "Combining Probability Distributions: A critic and an annotated bibliography", Statistical Science, 1(1), 1986, pages 114–148), there are two different approaches for the combination of probability density functions. The first approach can be described as a weighted sum of sub-probability density functions, a multi-modal probability density function deriving therefrom. The second possibility calculates the linked probability density as a weighted multiplication of the individual probability density functions. A uni-modal probability density function is obtained after a normalization.

A different approach is used here. The combined probability density function is assumed to be a Gaussian distribution whose average value and standard deviation are calculated by defining an average value and a standard deviation of a weighted sum of individual probability densities. Specific properties of the underlying acoustic model are thereby taken into consideration. The ordinary emission probability of a status of a hidden Markov model is modelled by a multi-modal probability density function, whereby all modes comprise diagonal covariance matrices and all variances are equal, i.e. $\Sigma = I \cdot \sigma^2$. Further, the emission probability of the linear predictor has a diagonal covariance matrix, whereof each variance is equated, i.e. $\Sigma_\xi = I \cdot \sigma_\xi^2$.

According to these assumptions, the weighted sum of the probability density functions of a mode (given by $\mathcal{N}(\mu, \Sigma)$)

and the linear predictor (given by $\mathcal{N}(\hat{O}_t, \Sigma_\varepsilon)$) are calculated as a two-modal probability density function.

$$(1-c)\cdot\mathcal{N}(\mu,\Sigma) + c\cdot\mathcal{N}(\hat{O}_t, \Sigma_\varepsilon) \quad (11).$$

In order to obtain a one-modal probability density, this weighted sum is approximated with $0<c<1$ by an individual Gaussian distribution in that an average value vector $\mu'$ and a global variance $\Sigma'=I\cdot\sigma'^2$ of this sum are defined as $$\mu' = (1-c)\cdot\mu + c\cdot\hat{O}_t \quad (12)$$

$$\sigma'^2 = (1-c)\cdot\sigma^2 + c\sigma_\varepsilon^2 + (1-c)\cdot c\cdot(\mu - \hat{O}_t)^2 \quad (13)$$

As a result thereof, the emission probability of the correlated hidden Markov models is established by a Gaussian distribution with average value $\mu'$ and variance $\Sigma'$. The combined probability is calculated by substituting the average value and the variance of all modes of all statusses according to Equation (12) and Equation (13).

A further step is comprised of leaving the modifications of the variances out of consideration. The variance of each individual hidden Markov model is assumed to be a constant in that $$\Sigma' = \Sigma \quad (14)$$

is set.

Only a modification of the averages is thus implemented, and the combined probability density function is obtained as a Gaussian distribution with a shifted average value vector according to Equation (12).

The combination of $P_1(O_t)$ and $P_2(O_t)$ ensues by forming a weighted sum whose average $\mu'$ and whose variance $\sigma'^2$ are determined by Equation (12) and Equation (13). When the influence of the variances is ignored in the emission calculation in the negative logarithmic range, then $$\text{distance} = \left(\frac{(1-c)\cdot\mu}{\mu} + \frac{c\cdot\hat{O}_t - O_t}{-\hat{O}_t}\right)^2 \quad (15)$$

is obtained as a distance between a feature vector $\hat{O}_t$ and the average $\mu$.

This Equation can be interpreted as a distance of a partially decorrelated feature vector O, and of a simultaneously transformed, traditional hidden Markov model prototype i.

Two confidence criteria $x_1$ and $x_2$ can thus be determined for all words, i.e. a respective criterion for a probability that a word is correctly recognized by the speech recognition system. A confidence criterion with whose assistance a decision as to whether the word is accepted or rejected is thus made for a recognized word. $x_1$ is thereby based on emission probabilities of traditional hidden Markov models and $x_2$ is based on emission probabilities modelled correlated:

$$x_1 = \frac{1}{t_2 - t_1 + 1}\cdot\sum_{t=t_1}^{t_2} -\log\left(\frac{P(O_t|q_t)}{P(O_t|\overline{q_t})}\right) \quad (16)$$

$$x_2 = \frac{1}{t_2 - t_1 + 1}\cdot\sum_{t=t_1}^{t_2} -\log\left(\frac{P'(O_t|q_t, O_{t-1}, \ldots, O_{t-p})}{P(O_t|\overline{q_t})}\right), \quad (17)$$

whereby $t_1$ references a starting time of a word, and $t_2$ references an ending time of a word.

A norming probability $P(O_t|\overline{q_t})$ that can be interpreted as an emission probability of an imaginary "anti-status" (see the publication by Junkawitsch et al., "Efficient method for detecting key words in continuous speech", Proc. Eurospeech, Vol. 1, 1997, pages 259–262) is established here by the average of the n best phoneme evaluations $$-\log P(O_t|\overline{q_t}) = \frac{1}{n}\sum_n (-\log P(O_t|q_n)). \quad (18)$$

The final "score" of the hypothesized word, which is compared to specific rejection thresholds, derives as a linear combination of the two confidence criteria, deriving as $$\text{Score} = w_1 x_1 + w_2 x_2 \quad (19).$$

The criterion "score" is thereby a final confidence criterion and determines the rejection decision, whereby, in particular, a comparison to a predetermined rejection threshold ensues. $w_1$ and $w_2$ reference predetermined weightings (for example, $w=w_2=0.5$).

Although other modifications and changes may be suggested by those skilled in the art, it is the intention of the inventors to embody within the patent warranted hereon all changes and modifications as reasonably and properly come within the scope of their contribution to the art.

LIST OF REFERENCES

[1] N. Haberland et al., "Sprachunterricht—wie funktioniert die computerbasierte Spracherkennung?", c't—Magazin für Computertechnik—May 1998, Heinz Heise Verlag, Hannover, 1998, pages 120–125.

[2] J. D. Markel et al., "Linear Prediction of Speech", Springer Verlag, New York, 1980, $2^{nd}$ Edition, pages 10–16.

[3] C. Genest et al., "Combining Probability Distributions: A critic and an annotated bibliography", Statistical Science, 1(1), 1986, pages 114–148.

[4] Junkawitsch et al., "Efficient method for detecting key words in continuous speech", Proc. Eurospeech, Vol. 1, 1997, pages 259–262.

[5] G. Ruske, "Automatische Spracherkennung" Oldenbourg Verlag, Munich 1988, pages 67–86.

We claim:

1. A method for recognizing spoken language with a computer, comprising the steps of:

a) determining a digitalized voice signal from the spoken language, b) performing a signal analysis on the digitized voice signal to generate feature vectors for describing the digitalized voice signal, c) performing a global search for imaging the feature vectors onto a language present in modelled form, describing phonemes of the language by a modified hidden Markov model, d) the modified hidden Markov model includes a conditional probability of a feature vector of a prescribed plurality of preceding feature vectors, e) approximating the conditional probability by a combination of two separately modelled probabilities, f) the first separately modelled probability ignores a correlation of the feature vectors, whereas the second separately modelled probability takes the correlation of the feature vectors into consideration, g) the spoken language is recognized in that a recognized word sequence is offered by the global search.

2. A method according to claim 1, wherein the modified hidden Markov model additionally includes a conditional probability of a respectively current status.

3. A method according to claim 1, further comprising the step of:

recognizing key words in the spoken language.

4. A method according to claim 1, further comprising the step of:

automatic, computer-assisted dialoging.

5. An apparatus for recognizing spoken language, comprising:

a) a unit for signal analysis that is configured such that feature vectors are determined from the spoken language, b) a unit for global searching that is configured such that the feature vectors are imaged onto a language present in modelled form, c) a processor unit that is configured such that a modified hidden Markov model includes a conditional probability for a current feature vector dependent on a predetermined plurality of preceding feature vectors, the conditional probability being approximated by a combination of two separately modelled probabilities, a first of said two separately modelled probabilities ignoring a correlation of the feature vectors, whereas a second of said two separately modelled probabilities takes the correlation of the feature vectors into consideration, and an imaging of the feature vectors onto the language present in modelled form is implemented with the modified hidden Markov model.

6. An apparatus according to claim 5, wherein the processor unit is configured such that the modified hidden Markov model additionally includes a conditional probability of a respectively current status.

7. A method for recognizing spoken language, comprising:

obtaining a first modeled probability that neglects a correlation of the feature vectors;

obtaining a second modeled probability, separate from the first modeled probability, that takes into account the correlation of the feature vectors; and obtaining an implied probability by combining the first and second probabilities.

* * * * *